United States Patent Office 2,773,703
Patented Dec. 11, 1956

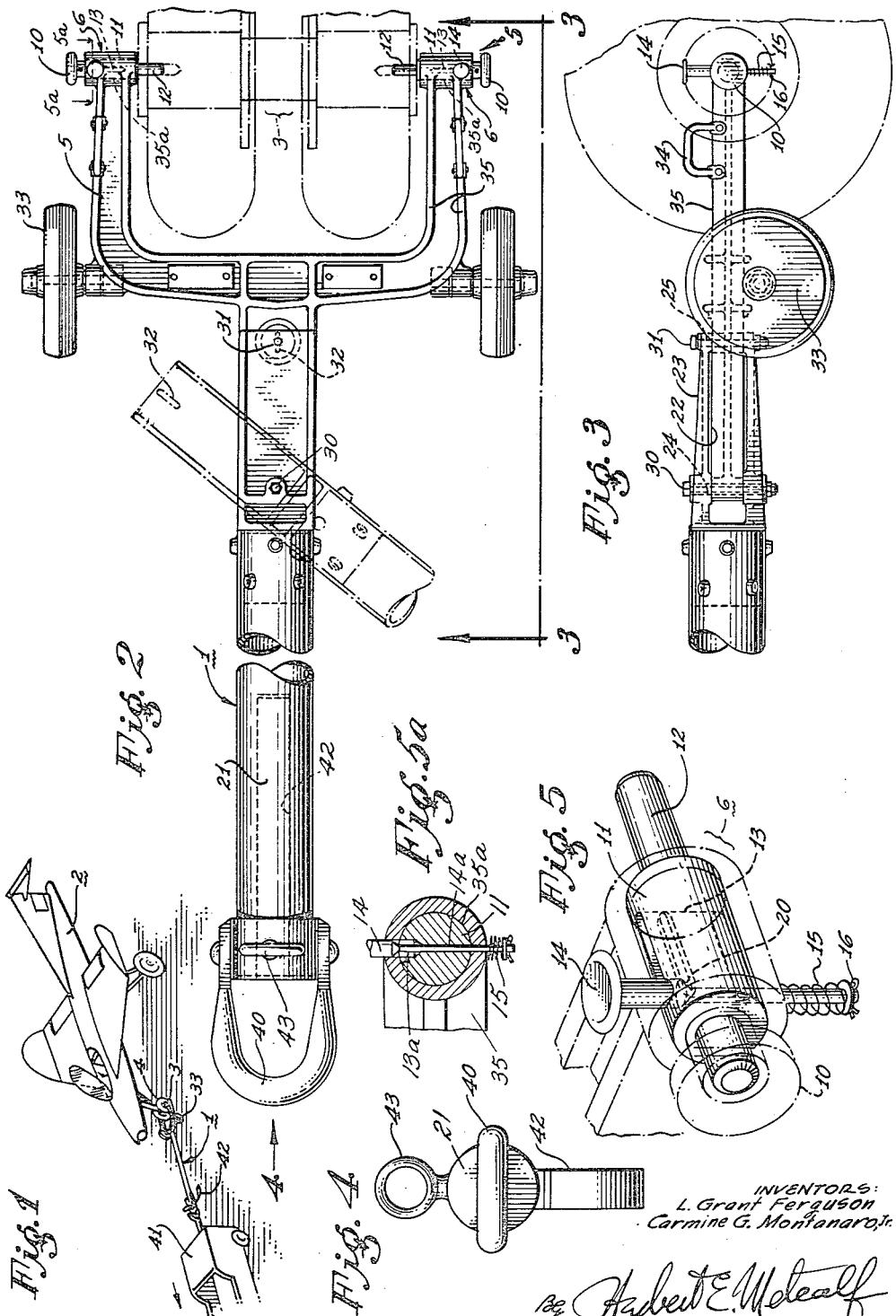

2,773,703

QUICKLY DETACHABLE WHEELED TOW BAR

Lachlan Grant Ferguson, Pacific Palisades, and Carmine G. Montanaro, Jr., Los Angeles, Calif., assignors to Northrop Aircraft, Inc., Hawthorne, Calif., a corporation of California Application February 5, 1954, Serial No. 408,332

4 Claims. (Cl. 280—476)

Our invention relates to the field of towing mechanisms and more particularly to a novel tow bar assembly for air craft towing.

Most present day aircraft having a nose wheel are designed in such a manner that the nose wheel is enabled to pivot within an arc of 45°. Should the tow car which is taxiing the plane about the field attempt to cause the plane to turn at a greater angle, severe stresses will be set up in the wheel axle with concomitant damage thereto. Furthermore, where an excess amount of force is applied in either a forward or rearward direction the landing gear strut assembly may be severely damaged.

It is therefore a general object of our invention to provide a novel tow bar assembly for taxiing aircraft on the ground.

A more specific object of our invention is to provide a tow bar assembly having a safety device rendering the assembly inoperative if used to turn the nose wheel in excess of its normal traversing arc.

A further object of our invention is to provide a tow bar assembly which effectively becomes inoperative if used to exert a forward or rearward force on the landing gear axle in excess of the design stress for the landing gear assembly.

Other objects and uses will become apparent to those skilled in the art in view of subsequent disclosure and drawings wherein:

Figure 1 is a perspective view of the tow bar assembly being used to tow a plane.

Figure 2 is top elevation of the assembly showing the pivot axis in the event that the lateral shear pin is caused to fail.

Figure 3 is a side elevational view looking in the direction of arrows 3—3 in Figure 2.

Figure 4 is a view looking in the direction of arrow 4 in Figure 2.

Figure 5 is an enlarged fragmentary view of the retaining pin looking in the direction of arrow 5 of Figure 2.

Figure 5a is a fragmentary cross section on the line 5a—5a of Figure 2 drawn on a larger scale and showing axle retaining parts in position to enable adjustment thereof.

Referring to the drawings, the tow bar assembly 1 is releasably secured to the aircraft 2 at the axle 3 of the nose wheel 4. A tow bar yoke 5 is formed at either end with terminal bosses having bores 35a in which axle retaining members 6 are adjustably mounted. Retaining members 6 are each formed as cylindrical elements having a hand hold 10 at their outer end, a central portion 11 of enlarged diameter which is reduced in diameter at its inner end to provide pins or extensions 12. The central portion is formed with a slot 13 therethrough having a short hole 13a of greater diameter than the width of slot 13 at its outer end to receive a locking pin 14 having an upper portion 20 of a diameter to fit into hole 13a and passing through a hole in the boss and an extension 14a of the diameter to pass through the slot 13. A compression spring 15 is seated on a washer 16 mounted on the lower end of said pin 14 and is in abutment with the outside diameter of the portion 11. Thus when the thicker portion 20 of the pin 14 is lifted vertically, the portion 11 is enabled to move axially outward to the extent of the length of the slot 13. The bar 21 of the assembly 1 extends outwardly from the center of the yoke 5 and is fabricated in two sections a tongue 22 extending from yoke 5 and 23 overlapping the tongue and forming the end portion of the tow bar 21. The inner section or tongue 22 is provided with two bores 24 and 25, and is joined to the outer yoke type section 23 by a forward pivotal shear pin 30 and rearward lateral shear pin 31 seated in said bores 24 and 25. The forward pin 30 has two functions, viz., to shear in the event of excess force applied thereto in either forward or rearward direction, and to act as a pivot point for the inner and outer sections 22 and 23. No such pivoting is possible until the lateral pin 31 is caused to fail through excess traversing of the assembly 1. The rearward opening in the inner section 22 which is elongated as indicated at 32 to provide for a reduction in shock stress in the event the forward pin 30 is sheared off due to undue force in either rearward or forward directions. For ease of assembly mobility wheels 33 are secured to the yoke member 5 on either side thereof, these wheels are of sufficient diameter to prevent the forward end of the tongue 22 from contacting the ground. In order to lift the assembly 1 and thus secure the extensions 12 within the axle 3 of the nose wheel 4, handles 34 are secured to the upper yoke surface 35. The tow bar 21 is formed with a lunette 40 to permit attachment on to a towing vehicle 41, a skid member 42 for support when not attached to any vehicle, and a handle grip 43 for holding the bar 21 during attachment and detachment.

The operation of our invention in view of the structural recitation follows. The yoke 5 is lifted by the handles 34 until the axis of the pins 12 is approximately in alignment with that of the axle 3 of the nose wheel 4. The locking pin 14 is lifted upwardly until the tapered sides 20 are within the counterbore of the slot 13. The pins are then retracted until their ends are flush with the inner sides of the yoke 5. With the axes of the axle 3 and the extensions 12 in alignment, the extensions are inserted into said axle 3 in cavities formed at each end thereof. The locking pin 14 is then released and forced into its operative position by virtue of the compression spring 15. If the assembly 1 is caused to turn the nose wheel 4 in excess of the wheel's designed traverse arc, the lateral pin 31 will shear off. This condition then permits the outer yoke section 23 of the tow bar 21 to pivot with respect to the inner section 22 about the forward pin 30. In this manner damage to the nose wheel assembly is precluded. Should the towing vehicle 41 exert too great a forward or rearward force along the tow bar 21, the forward shear pin 30 will fail and the outer section 23 will move the remaining distance of the slot 32 and then cause the lateral pin 31 to shear, thus taking up some of the impact force placed thereon.

Thus, by virtue of having provided a two sectioned tow bar 21 and shear pins 30 and 31 to so secure one section to the other, it has been possible to eliminate severe damage to an aircraft being towed on the ground.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A two part airplane tow bar assembly having a draft bar part and a yoke member connected together by shear pins characterized by the fact that said yoke portion is provided with wheel axle retaining means which comprise: mounting portions incorporated in the yoke arms and having axially aligned through bores, and aligned holes in the wall of said mounting portions on an axis intersecting said through bores; an axle retaining member positioned in and axially movable in each of said bores and provided with a longitudinally extending slot therethrough; and a locking pin extending both through the slot in each of said axle retaining members and the aligned bores in said mounting portions, said locking pin and axle retaining means being formed so as to enable the axle retaining members to be moved into operative position and then locked therein.

2. A two part airplane tow bar as set forth in claim 1 in which the hole in one side of the wall of said mounting portions is of larger diameter than the hole in the opposite side of the wall and the axle retaining member is provided with a slot of narrower width than the diameter of said larger hole and with a hole extending part way therethrough in the plane of said slot and opening into said slot, the locking pin having a portion of larger diameter fitting said larger hole and the hole in the locking member, the locking pin having a portion of narrower diameter fitting said slot and smaller hole in the mounting portion and extending outwardly therefrom; a coiled spring arranged on said projecting portion of the pin; and an abutment mounted at the outer end of said projecting portion of the pin, said spring being held under compression between the abutment and the mounting portion.

3. A two part airplane tow bar assembly as set forth in claim 1 and in addition comprising: a tongue extending forwardly from the yoke member of the assembly and wheels mounted on said yoke portion to hold the end of said tongue out of contact with the ground when the two portions of the tow bar become separated, and to facilitate positioning of the tow bar.

4. A two part airplane tow bar as set forth in claim 1 in which the hole in one side of the wall of said mounting portions is of larger diameter than the hole in the opposite side of the wall and the axle retaining member is provided with a slot of narrower width than the diameter of said larger hole and with a hole extending part way therethrough in the plane of said slot and opening into said slot, the locking pin having a portion of larger diameter fitting said larger hole and the hole in the locking member, the locking pin having a portion of narrower diameter fitting said slot and smaller hole in the mounting portion and extending outwardly therefrom; a coiled spring arranged on said projecting portion of the pin; an abutment mounted at the outer end of said projecting portion of the pin, said spring being held under compression between the abutment and the mounting portion; and a tongue extending forwardly from the yoke member of the assembly and wheels mounted on said yoke portion to hold the end of said tongue out of contact with the ground when the two portions of the tow bar become separated, and to facilitate positioning of the tow bar.

References Cited in the file of this patent

UNITED STATES PATENTS

| | | |
|---|---|---|
| 2,204,116 | Blocher | June 11, 1940 |
| 2,216,553 | Greene et al. | Oct. 1, 1940 |
| 2,287,955 | Zunino | June 30, 1942 |
| 2,340,273 | Phillips | Jan. 25, 1944 |
| 2,391,608 | Wood | Dec. 25, 1945 |
| 2,468,669 | Holmes | Apr. 26, 1949 |